US010685500B2

(12) United States Patent
Yuan

(10) Patent No.: US 10,685,500 B2
(45) Date of Patent: Jun. 16, 2020

(54) PUBLIC TRANSPORT ELECTRONIC SYSTEM

(71) Applicant: Yiqing Yuan, Liaoning (CN)

(72) Inventor: Yiqing Yuan, Liaoning (CN)

( * ) Notice: Subject to any disclaimer, the term of this patent is extended or adjusted under 35 U.S.C. 154(b) by 591 days.

(21) Appl. No.: 14/895,209

(22) PCT Filed: Jun. 4, 2014

(86) PCT No.: PCT/CN2014/079126
§ 371 (c)(1),
(2) Date: Dec. 2, 2015

(87) PCT Pub. No.: WO2014/194819
PCT Pub. Date: Dec. 11, 2014

(65) Prior Publication Data
US 2016/0117867 A1   Apr. 28, 2016

(30) Foreign Application Priority Data
Jun. 5, 2013 (CN) .......................... 2013 1 0220629

(51) Int. Cl.
*G07B 15/00* (2011.01)
*H04W 4/40* (2018.01)
*G06Q 20/32* (2012.01)
*G08G 1/123* (2006.01)
*G06Q 20/40* (2012.01)

(52) U.S. Cl.
CPC .......... *G07B 15/00* (2013.01); *G06Q 20/3224* (2013.01); *G06Q 20/3278* (2013.01); *G06Q 20/403* (2013.01); *G08G 1/123* (2013.01); *H04W 4/40* (2018.02)

(58) Field of Classification Search
CPC ..... G07B 15/00; H04W 4/40; G06Q 20/3224; G06Q 20/3278; G08G 1/123
See application file for complete search history.

(56) References Cited

U.S. PATENT DOCUMENTS

| | | | | |
|---|---|---|---|---|
| 6,374,176 B1 * | 4/2002 | Schmier | ................... | G08G 1/123 340/988 |
| 6,888,443 B2 * | 5/2005 | Ritter | ...................... | G07B 15/02 340/5.64 |
| 8,676,228 B2 * | 3/2014 | Strohbach | ............. | G01S 5/0289 455/456.1 |
| 9,741,177 B2 * | 8/2017 | Montealegre | .......... | G07B 15/02 |
| 2002/0029165 A1 * | 3/2002 | Takatori | ................. | G07B 15/02 705/13 |
| 2002/0069017 A1 * | 6/2002 | Schmier | ................. | G08G 1/123 701/469 |
| 2002/0069165 A1 * | 6/2002 | O'Neil | ................... | G06Q 20/04 705/40 |
| 2003/0164399 A1 * | 9/2003 | Harris | ................... | G06Q 20/045 235/382 |
| 2005/0004757 A1 * | 1/2005 | Neeman | ............. | G01C 21/3423 701/414 |
| 2006/0106671 A1 * | 5/2006 | Biet | ...................... | G07B 15/063 705/13 |
| 2006/0192050 A1 * | 8/2006 | Cheung | .................. | B64D 11/00 244/118.6 |
| 2007/0066397 A1 * | 3/2007 | Nammi | .................. | G06Q 10/02 463/42 |
| 2007/0078691 A1 * | 4/2007 | Wakabayashi | ......... | G06Q 50/30 705/5 |
| 2007/0265891 A1 * | 11/2007 | Guo | ....................... | G06Q 10/02 705/5 |
| 2007/0293155 A1 * | 12/2007 | Liao | ....................... | G06Q 20/32 455/41.2 |
| 2007/0299722 A1 * | 12/2007 | Stoffelsma | ............. | G06Q 20/18 705/13 |
| 2008/0010190 A1 * | 1/2008 | Rackley, III | ......... | G06Q 20/042 705/39 |
| 2008/0072284 A1 * | 3/2008 | Horvitz | .................. | G06F 30/00 726/2 |
| 2008/0154623 A1 * | 6/2008 | Derker | ................. | G06Q 10/087 705/1.1 |
| 2008/0306678 A1 * | 12/2008 | Miyawaki | ............. | G08G 1/127 701/118 |
| 2009/0063208 A1 * | 3/2009 | Stirlen | ................... | G06Q 10/02 705/6 |
| 2009/0119213 A1 * | 5/2009 | Hammad | ............... | G07B 15/02 705/44 |

(Continued)

OTHER PUBLICATIONS

Foth, "Enhancing the Experience of Public Transport Users with Urban Screens and Mobile Applications", published by MindTrek, on Oct. 6, 2010, all pages. (Year: 2010).*

(Continued)

*Primary Examiner* — Kevin H Flynn
*Assistant Examiner* — Omar Zeroual
(74) *Attorney, Agent, or Firm* — Ricky Lam

(57) ABSTRACT

The present invention discloses an electronic system for public traffic, which is integrated with at least one wireless communication system. When or after a passenger gets on and pays by a mobile phone, information about the owner of the mobile phone is detected so as to check or freeze a fund or an overdraft limit of a full fare in an account corresponding to the mobile phone of the passenger. When the fund or overdraft limit is lower than the full fare or a certain numerical value, there will be a prompt of "Insert coins" or "Please recharge". After the passenger gets off, by detecting or communicating with the wireless communication system of the mobile phone of the passenger by an electronic vehicle device, it is automatically judged that the passenger has got off; or by judging a distance relationship or position relationship between the electronic vehicle device and the mobile phone of the passenger, it is automatically judged that the passenger has got off, and the fare to be paid by the passenger is deducted at the same time or later.

9 Claims, No Drawings

(56) References Cited

U.S. PATENT DOCUMENTS

| | | | | |
|---|---|---|---|---|
| 2010/0153279 A1* | 6/2010 | Zahn | G06Q 10/02 | 705/80 |
| 2010/0197325 A1* | 8/2010 | Dredge | H04W 4/029 | 455/456.3 |
| 2010/0234062 A1* | 9/2010 | Ito | G01C 17/30 | 455/550.1 |
| 2011/0047037 A1* | 2/2011 | Wu | G06Q 20/204 | 705/17 |
| 2011/0068566 A1* | 3/2011 | Bartel | A61G 3/061 | 280/788 |
| 2011/0153495 A1* | 6/2011 | Dixon | G06Q 20/10 | 705/39 |
| 2011/0166995 A1* | 7/2011 | Fuerstenberg | G06Q 20/14 | 705/40 |
| 2011/0208645 A1* | 8/2011 | Knauft | G06Q 20/045 | 705/39 |
| 2012/0078732 A1* | 3/2012 | Heller | G06Q 20/102 | 705/14.73 |
| 2012/0101942 A1* | 4/2012 | Park | G06Q 20/102 | 705/40 |
| 2012/0143763 A1* | 6/2012 | Karp | G06Q 20/20 | 705/44 |
| 2012/0150601 A1* | 6/2012 | Fisher | H04W 4/21 | 705/14.23 |
| 2012/0235812 A1* | 9/2012 | Maia | G01S 13/08 | 340/539.13 |
| 2013/0030883 A1* | 1/2013 | Silbernagl | G06Q 20/04 | 705/13 |
| 2013/0041824 A1* | 2/2013 | Gupta | G06Q 20/14 | 705/44 |
| 2013/0105576 A1* | 5/2013 | Cho | G06Q 20/341 | 235/384 |
| 2013/0185123 A1* | 7/2013 | Krivopaltsev | G06Q 50/30 | 705/13 |
| 2013/0246207 A1* | 9/2013 | Novak | G06Q 30/0283 | 705/26.2 |
| 2013/0278415 A1* | 10/2013 | Morgan, Jr. | G08B 21/22 | 340/539.13 |
| 2014/0019216 A1* | 1/2014 | Jo | G06Q 20/3278 | 705/13 |
| 2014/0176328 A1* | 6/2014 | Koushik | G06Q 10/08 | 340/539.13 |
| 2014/0346825 A1* | 11/2014 | Mill | A61G 3/0808 | 297/232 |
| 2015/0178698 A1* | 6/2015 | Schulz | G06Q 20/145 | 705/13 |

OTHER PUBLICATIONS

Perrotta, "Fare Collection and Fare Policy", published by Transit Leadership Summit, Mar. 19, 2013, all pages (Year: 2013).*

Foth, "Enhancing the Experience of Public Transport Users with Urban Screens and Mobile Applications", published by MindTrek, on Oct. 6, 2010 (Year: 2010).*

Perrotta, "Fare Collection and Fare Policy", published by Transit Leadership Summit, Mar. 19, 2013 (Year: 2013).*

"Transit and Contactless Open Payments: An Emerging Approach for Fare Collection", A Smart Card Alliance Transportation Council White Paper, published on Nov. 2011 (Year: 2011).*

* cited by examiner

PUBLIC TRANSPORT ELECTRONIC SYSTEM

RELATED APPLICATIONS

The present application claims priority to the Chinese application CN201310220629.2 filed on Jun. 5, 2013, which is incorporated herein by reference in its entirety.

FIELD OF THE INVENTION

The present invention relates to the field of electronic systems, in particular to the field of an electronic system for public traffic.

BACKGROUND OF THE INVENTION

There are basically three existing bus charging manners: the first manner is receiving cash by a ticket seller; the second manner is self-service ticketing, in which the coin is inserted while getting on and it unable to get change; and, the final manner is paying by a bus card. The first manner wastes manpower resource; the second manner is inconvenient for passengers as it unable to get change; and, in the third manner, a passenger is likely to forget to bring the bus card or recharge the bus card, and it is not convenient to pay fees in a special payment window.

The existing bus charging condition or the process of taking a bus is basically such.

When there is a single fare, the fare is RMB 1, RMB 2 or RMB 3 in most cases, or the fare is RMB 4 in rare cases. Passages basically get on the bus from the front door and meanwhile pay by a card or insert coins, and then get off the bus from the rear door after arrival of a stop. No matter how many stops a passenger takes, the fare is the same.

For a long mileage, the separate charging is divided into the following types.

a. When the taking interval is only a section of a certain charging interval or a passenger takes the whole charging interval, there are roughly two cases: a passenger gets on the bus from the front door and pays by the bus card or insert coins, and then gets off the bus from the rear door after arrival of a stop; or, a passenger gets on the bus from the rear door, and then gets off the bus from the front door after arrival a stop and meanwhile pays by the bus card or insert coins.

b. For a passenger who takes a bus in two charging intervals, the passenger gets on the bus from the front door and meanwhile pays by the bus card or inserts the coins for this charging interval, and then gets off the bus from the front door after arrival a stop and pays by the bus card or inserts the coins for another charging interval; or, the passenger gets on the bus from the front door, meanwhile pays by the bus card or inserts the coins for the two charging intervals and gets a small card, for example, a yellow small card, and then gets off the bus from the front door after arrival a stop and returns the small card.

c. If the taking interval is three charging intervals, a passenger gets on the bus from the front door, meanwhile pays by the bus card or inserts the coins for this charging interval, and then gets off the front door after arrival a stop and pays by the bus card or inserts the coins for other two charging intervals; or the passenger gets on the bus from the front door, meanwhile pays by the bus card or inserts the coins for the three charging intervals and gets small cards, for example, a yellow small card or green small card, the passenger must have the cards of two colors to distinguish from the passengers taking two intervals, and then the passenger gets off the bus from the front door after arrival a stop and returns the small cards.

The past buses have the following defects.

1. As it is unable to realize the merged running of a plurality of bus routes, several routes of buses often run a same long-distance road segment in an urban main road or busy road segment, the routes are repeated and the vacant seat rate is high in most times; meanwhile, the several routes of buses often share a stop, thereby resulting in traffic jam or other phenomena.

2. The fare is reasonable and inaccurate and cannot be charged according to the specific mileage. For example, the fare of taking a stop is the same as that of the whole journey. Particularly, the case where the single fare is RMB 2, RMB 3 or RMB 4 is not reasonable. For another example, if a passenger only takes two stops, the fare is the same as the fare for taking two whole segments; for example, the passenger gets on the bus at a former stop of the segment and then gets off the bus after the segment stop.

3. The funding process is complicated and involves many persons, the substantial accumulation of changes requires a large amount of manpower and material resources for checking, and the currency circulation is influenced.

4. For a bus of segment charging, as passengers need to get on or off from the front door or from the rear door, the passenger flow in the bus is recycled and crowded; meanwhile, passengers need to pay by a bus card or insert coins while getting on, or pay by the bus card or insert coins while getting off, the situation is very disordered and complicated. For the complicated situation, getting on or off from the front door or getting on or off from the rear door, paying by the bus card or inserting the coins while getting on or off, a green card or a yellow card, which stops are segment stops, which stops are idle stops or free stops . . . , even the driver of this bus needs to take several hours or even one day or two days to get it, and the driver is easy to divert his/her attention and make mistakes during driving.

5. It is likely to have such events, like taking a bus without paying fare, or taking a bus without paying sufficient fare, i.e., taking a longer distance than the distance of paying fare.

6. The amount of labor of a driver increases, and it is likely to influence the mind and emotion of the driver to a certain extent, so that the safety of the driver is influenced.

7. The number of passengers in the bus cannot be adjusted and balanced, the specific number of passengers is controlled difficultly, and the high and low peaks of passengers cannot be adjusted by a price mechanism. In other words, it is impossible to implement a high peak fare and a low peak fare, a high fare in a full load state, and give an alarm and forbid to get on in an overload state; and, it is impossible for passengers having the older card or the preferential card to "charge" in a high peak and to "reduce the fare" or "be free" in a flat peak or low peak.

8. It is unable to control or sell seats, so various disadvantages are generated. For example, many times, no one offers his/her seat to elderly, infirm, sick, disabled and pregnant passengers; passengers wait for seats and grab for seats in the starting stop or grab for seats in other stops, while some passengers have no seat when they are tired or sick; in addition, for a long route, some passengers get tired sitting, while some passengers are more tired as standing in the whole journey, so both parties may be relaxed as long as they exchange with each other.

9. When an emergency such as public security or sanitation occurs, it is unable to know or immediately know related data of a passenger at that moment. For example, during "SARS", when a "SARS" person takes a bus, it is unable to find out persons on the same bus for isolation.

10. The bus management department is unable to make well statistics to passengers, particularly real-time statistics, thereby influencing the dispatching of buses.

11. Sometimes, it is required to have a ticket seller on a bus.

12. The bus cost is high, and the bus efficiency and benefit are low.

13. It is unable to reduce the fare when a passenger gets on an express bus halfway, so that the problems of not allowing passengers to get on the express bus halfway are caused.

14. A passenger has to additionally carry an IC card or change.

As the volume of vehicle horns of existing motor vehicles such as buses or taxies is fixed, the volume of the vehicle horn is too high when a vehicle is parking or running at a low speed, so that residents are disturbed and it is easy to frighten surrounding persons and animals; however, when a vehicle runs at 100 km/h, 120 km/h or even 180 km/h, the volume of the vehicle horn remains unchanged and is too low, so that it is not enough to remind vehicles and pedestrians in front.

OBJECTS AND SUMMARY OF THE INVENTION

Therefore, it is an object of the claimed invention to provide a significantly improved an intelligent electronic system for public traffic.

To achieve the above object, the preset invention employs the following technical solutions: at least one wireless communication system is integrated; when or after a passenger gets on and pays by a mobile phone, information about the owner of the mobile phone is detected so as to check or freeze a fund or an overdraft limit of a full fare in an account corresponding to the mobile phone of the passenger; when the fund or overdraft limit is lower than the full fare or a certain numerical value, there will be a prompt of "Insert coins" or "Please recharge"; after the passenger gets off, by detecting or communicating with the wireless communication system of the mobile phone of the passenger by an electronic vehicle device, it is automatically judged that the passenger has got off; or by judging a distance relationship or position relationship between the electronic vehicle device and the mobile phone of the passenger, it is automatically judged that the passenger has got off, and the fare to be paid by the passenger is deducted at the same time or later; or the full fare is deducted when or after the passenger gets on, and the fare for a remaining journey is returned back after the passenger gets off; and, a passenger with a seat is required to pay seat fee in addition to the fare.

The wireless communication system includes NFC, a Bluetooth, Wi-Fi, WLAN, a GPS (Global Positioning System), a Beidou satellite positioning system, a Galileo satellite positioning system, a Glonass satellite positioning system and a mobile operation network base station positioning system, and it is automatically judged that the passenger has got off by at least one of the wireless communication systems.

Like the fare, the seat fee is also charged according to the specific mileage or time, which is accurate to 50 m or below or accurate to minute or below; the electronic system for public traffic automatically makes statistics and controls the seals of the whole bus in the whole journey; and, the seats are preferably and freely assigned to the elderly, infirm, sick, disabled and pregnant passengers and secondarily assigned to passengers who pay fee for seats, and the remaining seats are arbitrarily selected by passengers.

When the electronic system for public traffic judges that the passenger has got off, the software, hardware and functions of the mobile phone of the passenger will be recovered to a state before getting on, in addition to those set by the carrier of the mobile phone.

The accurately and instantly statistical related information of a bus comprises: time, location, route, flow direction, the number of people, load factor, name, the number of reasonable buses, frequency of a bus and route dispatching, and the related information is confidential.

If payment is done by a same mobile phone for n times at a same stop, it is indicated that n passengers are to get on, and all the fares are paid by the account corresponding to the mobile phone.

The electronic system for public traffic is applicable to taxies, trains, airplanes and steamships.

A module with a function of automatically regulating the volume of a vehicle horn according to a speed is provided, wherein the speed of a vehicle is reflected by the frequency of a pulse generated by rotating a magnetic field, that is, the volume is positively correlated to the frequency.

When the speed is below 70 km/h, the speed is directly proportional or positively correlated to the volume of the vehicle horn; and, when the speed is more than 70 km/h, the volume of the vehicle horn is a maximum, that is, the volume is a maximum prescribed by the national standards or does not exceed 20% of the maximum prescribed by the national standards.

The electronic system for public traffic is applicable to other motor vehicles, such as motorcycles, cars, passenger cars, lorries, technical vehicles and trains.

The present invention has the following beneficial effects: the specific mileage of a passenger is accurately calculated and the fare of the passenger is reasonably charged, thereby reducing the cost of fund receipt and payment, reasonably planning and designing bus routes, realizing merged running, reducing the total number of buses without reducing the service quality, reintegrating the bus resources and improving the utilization rate of public traffic resources; the total number of buses inside the city and the total running mileage of buses inside the city may be reduced with a reduction being about 5% of the total number, and the related persons and expenses are reduced with a reduction being about 5% of the total number; the bus operating cost may be reduced, the related information of passengers may be more accurately and instantly collected, including time, location, bus route, flow direction, the number of passengers, load factor, name and the like, so that the buses and the number of buses may be more reasonably arranged and dispatched; the bus operating time in small and medium0sized cities, villages and towns and main roads of development areas may be prolonged, the congestion of bus routes in large and medium-sized cities and the crowding phenomenon of bus stops may be relieved, and the requirements of passengers, such as pay fees for seats, short time for waiting for a bus, convenient payment and the like, may be better met. Thus, the phenomenon of taking a bus without paying fare is avoided, the crowding phenomenon in the bus is relieved, the amount of labor of a driver is alleviated, the efficiency of getting on or off is improved, the safety is improved, the economic benefits are enhanced, and the city efficiency is improved. Moreover, the volume of a vehicle horn does not disturb residents, does not frighten surrounding persons and animals, and may fully remind vehicles and pedestrians in front at a high speed.

Various other objects, advantages and features of the present invention will become readily apparent from the ensuing detailed description, and the novel features will be particularly pointed out in the appended claims.

DETAILED DESCRIPTION OF THE EMBODIMENTS

The present invention employs the following technical solutions: at least one wireless communication system is integrated; when or after a passenger gets on and pays by a mobile phone, information about the owner of the mobile phone is detected so as to check or freeze a fund or an overdraft limit of a full fare in an account corresponding to the mobile phone of the passenger; when the fund or overdraft limit is lower than the full fare or a predefined value or a certain numerical value, there will be a prompt of "Insert coins" or "Please recharge"; after the passenger gets off, by detecting or communicating with the wireless communication system of the mobile phone of the passenger by an electronic vehicle device, it is automatically judged that the passenger has got off; or by judging a distance relationship or position relationship between the electronic vehicle device and the mobile phone of the passenger, it is automatically judged that the passenger has got off, and the fare to be paid by the passenger is deducted at the same time or later; or the full fare is deducted when or after the passenger gets on, and the fare for a remaining journey is returned back after the passenger gets off; and, a passenger with a seat is required to pay seat fee in addition to the fare.

The wireless communication system includes NFC, a Bluetooth, Wi-Fi, WLAN, a GPS (Global Positioning System), a Beidou satellite positioning system, a Galileo satellite positioning system, a Glonass satellite positioning system and a mobile operation network base station positioning system, and it is automatically judged that the passenger has got off by at least one of the wireless communication systems.

The full English name of the NFC is Near Field Communication, which is integrated and evolved from the non-contact Radio Frequency Identification (RFID) and the interconnection and interoperability technology, and realizes mobile payment, electronic ticket business, access control, mobile identity recognition, anti-fake or other applications by using a mobile terminal by integrating an induction card reader, an induction card and a point-to-point communication function on a single chip. A typical operating distance is only several centimeters, the running distance range is within 20 cm, and the data transmission speed may be selected as 106 Kb/s, 212 Kb/s or 424 Kb/s and may be improved to about 1 Mb in future. The NFC information transfer is realized by an electromagnetic induction coupling mode of a radio frequency portion in a frequency spectrum.

The charging manners of the present invention are as follows.

Embodiment 1

When a passenger takes a bus, a vehicle receiver automatically opens the NFC or Bluetooth of a mobile terminal of the passenger and allows the NFC or Bluetooth to paired and connected with the vehicle receiver, so as to check or freeze or deduct a full fare of this bus ticket from a corresponding payment account of the passenger. If the fare in the account of the passenger is insufficient or lower than a predefined value or a certain numerical value, a prompt will be given out. After the passenger gets off the bus, an electronic vehicle device detects or communicates with a wireless communication system of the mobile phone of the passenger so as to automatically judge whether the passenger has got off the bus, or judges a distance relationship or position relationship between the electronic vehicle device and the mobile phone of the passenger so as to judges whether the passenger has got off the bus, and meanwhile deducts the fare to be paid by the passenger or returns the fare for the remaining mileage. If the passenger additionally pays fee for a seat, the actual fare is a sum of a product of the mileage and time which the passenger takes multiplied by the fare per kilometer plus the seat fee. If the passenger is an elderly, infirm, sick, disable or pregnant passenger, it is not required to take additional seat fee. After the passenger pays by the mobile phone or shows a related certificate, the electronic system for public traffic will automatically assign a free seat.

Embodiment 2

When a passenger takes a bus, a vehicle receiver automatically opens corresponding position information software of a mobile phone of the passenger, the electronic system for public traffic acquires position information of the mobile phone of the passenger and meanwhile checks or freezes or deducts a full fare of this bus ticket from a corresponding payment account of the passenger. If the fare in the corresponding account of the passenger is insufficient or lower than a certain numerical value, for example, if the remaining fund in the account is less than RMB 10, a prompt will be given out, and the distance will be counted using the mileage while latest closing or opening the front door as a starting point. When the passenger gets off the bus from the rear door after arrival a stop, the electronic system for public traffic performs a distance comparison to the position information of the mobile phone of the passenger and the position information of the electronic system for public traffic. If the distance is larger than the length of the bus, it is judged that the passenger has got off the bus, and the corresponding position information software of the mobile phone of the passenger is closed; meanwhile, using the mileage while latest closing or opening the rear door as a terminal point, the mileage of taking the bus of the passenger is calculated, and the fare obtained by multiplying the mileage by a unit fare is deducted from the corresponding account associated with the mobile phone of the passenger or the more fare for the remaining mileage is returned. If the passenger additionally pays fee for a seat, the actual total fare is a sum of a product of the mileage and time which the passenger takes multiplied by the fare per kilometer plus the seat fee. And in cases where the full fare of the desired journey is deducted when or after the passenger gets on, and the fare for a remaining journey deducting the total fare from the full fare is returned back after the passenger gets off. If the passenger is an elderly, infirm, sick, disable or pregnant passenger, it is not required to take additional seat fee. After the passenger pays by the mobile phone or shows a related certificate, the electronic system for public traffic will automatically assign a free seat.

Embodiment 3

When a passenger takes a bus which has a single fare or charged in segments, a vehicle receiver automatically acquires position information of a mobile phone of the passenger, compares it with position information of the bus, and meanwhile checks or freezes or deducts a full fare of this bus ticket from a corresponding payment account of the passenger and counts the distance by using the mileage while latest closing or opening the door as a starting point. When the passenger gets off the bus from the rear door, the position information of the electronic system for public traffic is for example larger than 10 m or 20 m in comparison to the position information of the mobile phone of the passenger, it is judged that the passenger has got off the bus, meanwhile the mileage of taking the bus of the passenger is calculated by using the mileage while latest closing or opening the rear door as a terminal point, and the fare obtained by multiplying the mileage by a unit fare is deducted from the corresponding account associated with the mobile phone of the passenger or the more fare for the remaining mileage is returned. If the fare in the corresponding account of the passenger is insufficient or lower than a certain numerical value, for example, if the remaining fund in the account is less than RMB 10, a prompt will be given out. If the passenger additionally pays fee for a seat, the actual fare is a sum of a product of the mileage and time which the passenger takes multiplied by the fare per kilometer plus the seat fee. If the passenger is an elderly, infirm, sick, disable or pregnant passenger, it is not required to take additional seat fee. After the passenger pays by the mobile phone or shows a related certificate, the electronic system for public traffic will automatically assign a free seat.

Embodiment 4

If a passenger takes a county-level, intercity or interprovincial long-distance bus and while the passenger gets on the bus and pays by his/her mobile phone, the Bluetooth of the mobile phone of the passenger is automatically opened and in Bluetooth pairing with an electronic system for public traffic, so that a full fare is checked or frozen or deducted from a corresponding payment account of the passenger and the distance is counted by using the mileage while latest closing or opening the door as a starting point. After the passenger takes off the bus after arrival a stop, the Bluetooth of the mobile phone is disconnected from the Bluetooth of the electronic system for public traffic; or, as the signal from the Bluetooth of the mobile phone is weakened, the electronic system for public traffic judges that the passenger has got off the bus and meanwhile calculates the mileage of taking the bus of the passenger by using the mileage while latest closing or opening the rear door as a terminal point, and the fare obtained by multiplying the mileage by a unit fare is deducted from the corresponding account associated with the mobile phone of the passenger or the more fare for the remaining mileage is returned. If the fare in the corresponding account of the passenger is insufficient or lower than a certain numerical value, for example, if the remaining fund in the account is less than RMB 50, a prompt will be given out. Finally, the software, hardware and functions of the mobile phone will be recovered to a state before getting on, in addition to those set by the carrier of the mobile phone. The Bluetooth communication distance of the electronic system for public traffic of a long-distance bus should generally be greater than 80 m, so as to prevent from Bluetooth signal interruption when the passenger gets off the bus to go to the toilet or go shopping temporarily, thus preventing paying by the mobile phone again when getting on the bus and restarting the corresponding distance counting, charging and deduction procedures. If the long-distance bus overloads, the electronic system for public traffic will give an alarm and forbids getting on the bus. If the long-distance coach or bus parks at a non-stop, the fare should be automatically added with a small non-stop parking fee.

Embodiment 5

When a passenger takes a long-distance bus, corresponding position information software of a mobile phone of the passenger will be automatically opened when the passenger gets on the bus and pays by the mobile phone, and the electronic system for public traffics acquires position information of the passenger and meanwhile checks or freezes or deducts a full fare of this bus ticket from a corresponding payment account of the passenger and counts the distance by using the mileage while latest closing or opening the door as a starting point. When the passenger gets off the bus from the rear door, the position information of the electronic system for public traffic is for example larger than 100 m in comparison to the position information of the mobile phone of the passenger, it is judged that the passenger has got off the bus, meanwhile the mileage of taking the bus of the passenger is calculated by using the mileage while latest closing or opening the rear door as a terminal point, and the fare obtained by multiplying the mileage by a unit fare is deducted from the corresponding account associated with the mobile phone of the passenger or the more fare for the remaining mileage is returned. If the fare in the corresponding account of the passenger is insufficient or lower than a certain numerical value, for example, if the remaining fund in the account is less than RMB 50, a prompt will be given out.

The seats are preferably and freely assigned to the elderly, infirm, sick, disabled and pregnant passengers and secondarily assigned to passengers who pay fee for seats, and the remaining seats are arbitrarily selected by passengers. A passenger who pay fee for a seat has an additional seat fee in addition to the fare. Like the fare, the seat fee is charged according to the specific taking mileage or time, which is accurate to meter or 0.1 minute. The electronic system for public traffic automatically counts and control seats on the bus in the whole journey.

When the electronic system for public traffic judges that the passenger has got off, the software, hardware and functions of the mobile phone of the passenger will be recovered to a state before getting on, in addition to those set by the carrier of the mobile phone.

The accurately and instantly statistical related information of a bus includes: time, location, route, flow direction, the number of people, load factor, name, the number of reasonable buses, frequency of a bus and route dispatching, and the related information is confidential.

If payment is done by a same mobile phone for n times at a same stop, it is indicated that n passengers are to get on, and all the fares are paid by the account corresponding to the mobile phone.

The electronic system for public traffic is applicable to taxies, trains, airplanes and steamships.

The electronic system for public traffic involves a vehicle horn. The speed of a vehicle is reflected by the frequency of a pulse generated by rotating a magnetic field, that is, the volume is positively correlated to the frequency. Under normal conditions, when the speed is below 70 km/h, the speed is directly proportional or positively correlated to the volume of the vehicle horn; and, when the speed is more than 70 km/h, the volume of the vehicle horn is a maximum. The volume, timbre, tone or other parameters of the vehicle horn are adjustable. For example, the vehicle horn is long pressed for above 5 seconds, whenever the vehicle horn is pressed within 2 hours, the volume of the vehicle horn is an extreme value or approximate to the extreme value for use in a case of emergency or in particular cases. 2 hours later, the volume of the vehicle horn is still positively correlated to the speed. If the vehicle horn is long pressed for above 10 seconds, whenever the vehicle horn is pressed, the volume is an extreme value or approximate to the extreme value. For example, the currently used vehicle horns are in accordance with the current national standards for horns of motor vehicles. Other parameters and performances of a vehicle horn may be debugged by continuously pressing the vehicle horn for many times. For example, if the vehicle horn is continuously pressed for 5 times, a relation curve of the volume of the vehicle horn and the speed, the timbre of the vehicle horn and the frequency of the vehicle horn may be changed.

What is claimed is:

1. An electronic system for public traffic using a public transport vehicle, comprising:
   a vehicle device installed in the public transport vehicle including a wireless communication system; and
   a passenger mobile device including the wireless communication system and a processor for executing a software stored in the passenger mobile device to generate position information of the passenger mobile device held by a passenger, wherein:
   the wireless communication system, which wirelessly connects the vehicle device and the passenger mobile device, includes at least one of NFC, Bluetooth, Wi-Fi, WLAN, GPS (Global Positioning System), Beidou satellite positioning system, Galileo satellite positioning system, Glonass satellite positioning system and mobile operation network base station positioning system;
   when the passenger gets on the public transport vehicle from a front or a rear door, the vehicle device, via the wireless communication system, detects the passenger mobile device;
   a full fare is what the passenger potentially has to pay if the passenger rides on the public transport vehicle for an entire route planned for the public transport vehicle;
   a journey fare is what the passenger actually owes when the passenger rides on the public transport vehicle for a desired portion of the entire route;
   the desired portion of the entire route, which entails its mileage and duration, begins when the passenger gets on the public transport vehicle and terminates when the passenger gets off the public transport vehicle;
   the journey fare is based on the mileage and duration multiplied by a unit price;
   when or after the passenger gets on the public transport vehicle from the front or the rear door, information about a payment account of the passenger linked with the passenger mobile device is detected by the vehicle device;
   the vehicle device attempts to check or freeze the full fare from a fund or an overdraft limit in the payment account;
   when the fund or the overdraft limit is less than the full fare or a pre-defined value, the passenger receives from the vehicle device a prompt of "Insert coins" or "Please recharge" on the passenger mobile device;
   when the passenger gets off the public transport vehicle from the front or the rear door after arrival of a stop, the vehicle device performs a distance comparison of a distance between position information of the passenger mobile device and position information of the vehicle device with length of the public transport vehicle; if the distance between the position information of the passenger mobile device and the position information of the vehicle device is greater than the length of the public transport vehicle, the vehicle device determines that the passenger has got off the public transport vehicle; the software stored in the passenger mobile device is closed after the passenger gets off; and the journey fare is calculated by the vehicle device;
   if no fare is deducted upfront when or after the passenger gets on the public transport vehicle, the journey fare will be deducted by the vehicle device from the payment account when or after the passenger gets off the public transport vehicle;
   if the full fare is deducted upfront when or after the passenger gets on the public transport vehicle, the fare deducted in excess of the journey fare will be returned by the vehicle device to the payment account; and
   a seat fee will be deducted by the vehicle device from the payment account if the passenger selects a seat using the passenger mobile device.

2. The electronic system in claim 1, wherein:
   it is automatically determined that the passenger has got off by both the wireless communication system of the vehicle device and the wireless communication system of the passenger mobile device.

3. The electronic system in claim 1, wherein:
   the seat fee is charged according to a specific mileage or time, which is either accurate to 50 m or below or accurate to a minute or below;
   the vehicle device automatically makes statistics and controls seats of the whole public transport vehicle in a whole journey of the public transport vehicle; and wherein the vehicle device freely assigns the seats to elderly, inform, sick, disabled and pregnant passengers and then assigns the seats to passengers who pay the seat fee and the seats which have not been assigned are arbitrarily selected by passengers.

4. The electronic system in claim 1, wherein when the vehicle device determines that the passenger has got off, software and hardware and functions of the passenger mobile device are recovered to a state before getting on the public transport vehicle, in addition to those set by a carrier of the passenger mobile device.

5. The electronic system in claim 1, wherein:
   the passenger mobile device is capable of making payment for n times at one stop using the same passenger mobile device;
   the n times indicates that n passengers are to get on; and
   all fares related to n passengers are paid by the payment account corresponding to the passenger mobile device.

6. The electronic system in claim 1, wherein the public transport vehicle is one of a bus, a taxi, a car, a passenger car, a train, an airplane, a steamship, a motorcycle, a lorry, or a technical vehicle.

7. The electronic system in claim 1, further comprising an automatic regulator for adjusting volume of a horn of the public transport vehicle according to speed of the public transport vehicle, wherein the speed of a vehicle is reflected by frequency of a pulse generated by rotating a magnetic field, and wherein the volume is positively correlated to the frequency.

8. The electronic system in claim 7, wherein:
   when the speed is below 70 km/h, the speed is directly proportional or positively correlated to the volume of the vehicle horn;
   when the speed is more than 70 km/h, the volume of the vehicle horn is a maximum volume that is prescribed by national standards or a volume that does not exceed 20% of the maximum volume prescribed by the national standards.

9. The electronic system in claim 1, wherein: the passenger's getting off the public transport vehicle is determined by:

detecting or communicating with the wireless communication system of the passenger mobile device with the wireless communication system of the vehicle device; or determining a distance relationship or position relationship between the vehicle device and the passenger mobile device.

* * * * *